US011259226B2

(12) United States Patent
Kim

(10) Patent No.: US 11,259,226 B2
(45) Date of Patent: Feb. 22, 2022

(54) HANDOVER METHOD AND APPARATUS IN WIRELESS COMMUNICATION SYSTEM SUPPORTING EICIC FUNCTION

(71) Applicant: Samsung Electronics Co., Ltd., Suwon-si (KR)

(72) Inventor: Wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 16/486,713

(22) PCT Filed: Feb. 28, 2018

(86) PCT No.: PCT/KR2018/002480
§ 371 (c)(1),
(2) Date: Aug. 16, 2019

(87) PCT Pub. No.: WO2018/160009
PCT Pub. Date: Sep. 7, 2018

(65) Prior Publication Data
US 2019/0380077 A1 Dec. 12, 2019

(30) Foreign Application Priority Data
Feb. 28, 2017 (KR) .................. 10-2017-0026163

(51) Int. Cl.
*H04W 36/08* (2009.01)
*H04W 36/00* (2009.01)

(52) U.S. Cl.
CPC ..... *H04W 36/08* (2013.01); *H04W 36/00837* (2018.08)

(58) Field of Classification Search
None
See application file for complete search history.

(56) References Cited

U.S. PATENT DOCUMENTS 9,276,662 B2    3/2016  Seo et al.
2012/0190365 A1  7/2012  Jeong et al.
(Continued)

FOREIGN PATENT DOCUMENTS

EP      2 807 859 A2   12/2014
KR   10-2012-0084533 A  7/2012
(Continued)

OTHER PUBLICATIONS

New Postcom, Performance evaluation for mobility in HetNet with TD-ICIC, 3GPP TSG RAN WG2 Meeting #78, R2-122268, XP050607221, May 15, 2012, Prague, Czech Republic.
(Continued)

*Primary Examiner* — Hassan A Phillips
*Assistant Examiner* — Gautam Sharma
(74) *Attorney, Agent, or Firm* — Jefferson IP Law, LLP

(57) ABSTRACT

The present invention relates to a handover method and apparatus in a wireless communication system supporting an eICIC function. A communication method of a first base station in a heterogeneous network wireless communication system, which includes the first base station and a second base station and supports a cell range expansion (CRE) function, comprises the steps of: monitoring whether the cell range expansion function is deactivated; when the deactivation of the cell range expansion function is detected, generating a handover request message; and transmitting the handover request message to the second base station.

10 Claims, 11 Drawing Sheets

(56) References Cited

U.S. PATENT DOCUMENTS

| | | | |
|---|---|---|---|
| 2012/0282864 A1 | 11/2012 | Dimou et al. | |
| 2013/0244664 A1* | 9/2013 | Song | H04W 36/00835 455/437 |
| 2013/0303167 A1 | 11/2013 | Zhu et al. | |
| 2013/0343270 A1* | 12/2013 | Abe | H04W 68/005 370/328 |
| 2014/0056243 A1* | 2/2014 | Pelletier | H04W 72/1268 370/329 |
| 2014/0198659 A1 | 7/2014 | Vargas Bautista et al. | |
| 2015/0031369 A1 | 1/2015 | Gunnarsson et al. | |
| 2015/0049672 A1* | 2/2015 | Luo | H04W 40/16 370/328 |
| 2015/0119053 A1* | 4/2015 | Morimoto | H04W 16/08 455/450 |
| 2016/0006659 A1 | 1/2016 | Kim et al. | |
| 2016/0295472 A1* | 10/2016 | Huang | H04L 5/006 |
| 2016/0345338 A1 | 11/2016 | Kim et al. | |
| 2016/0353451 A1* | 12/2016 | Ko | H04W 24/10 |
| 2018/0007603 A1* | 1/2018 | Miranda | H04W 36/0058 |

FOREIGN PATENT DOCUMENTS

| | | |
|---|---|---|
| KR | 10-2016-0004162 A | 1/2016 |
| WO | 2012/093888 A2 | 7/2012 |
| WO | 2015/115784 A1 | 8/2015 |

OTHER PUBLICATIONS

New Postcom, Evaluation for mobility state estimation in HetNet, 3GPP TSG RAN WG2 Meeting #77bis, R2-121187, XP050606192, Mar. 20, 2012, Jeju, Korea.

Qualcomm Incorporated, Discussion on detection of UE interference condition at handover, 3GPP Draft, R2-122850, XP050607471, May 15, 2012, Prague, Czech Republic.

Huawei et al., Clarification on UL64QAM capability, 3GPP TSG-RAN WG2 Meeting #90, R2-152850, May 25-29, 2015, Fukuoka, Japan.

Extended European Search Report dated Oct. 24, 2019, issued in European Application No. 18760602.5.

* cited by examiner

HANDOVER METHOD AND APPARATUS IN WIRELESS COMMUNICATION SYSTEM SUPPORTING EICIC FUNCTION

TECHNICAL FIELD

The disclosure relates to a method and an apparatus for handover in a wireless communication system supporting an enhanced Inter-Cell Interference Coordination (eICIC) function and, more particularly, to a method and apparatus for handover of a terminal according to activation or deactivation of a cell range expansion function in a wireless communication.

BACKGROUND ART

In general, a mobile communication system has been developed to provide voice services while guaranteeing activity of users. The mobile communication system has gradually expanded its service area up to a data service as well as a voice service and has been developed to provide a high-speed data service at present. However, since resources are lacking and users demand higher speed services in the current mobile communication system, a further improved mobile communication system is needed.

To meet the demands, standardization of Long Term Evolution (LTE) is progressed by the 3rd Generation Partnership Project (3GPP) as one of the next generation mobile communication systems that are being developed. LTE is a technology of implementing high speed packet-based communication with a transmission rate of up to several hundreds Mbps. To this end, several methods are discussed, including a method of reducing the number of nodes located on a communication channel by simplifying a network architecture, a method of making wireless protocols closest to a wireless channel, and the like.

In particular, standardization for time-domain inter-cell interference coordination has been recently conducted, and a base station is thus required to efficiently manage a terminal.

DETAILED DESCRIPTION OF INVENTION

Technical Problem

Therefore, the disclosure has been made in view of the above-mentioned problems, and the disclosure provides a method and an apparatus for efficiently managing a terminal by a base station in a heterogeneous network mobile communication system in which a macro cell and a small cell co-exist.

Specifically, the disclosure provides a method and an apparatus for preventing occurrence of a radio link failure (RLF) due to a change in a cell range of a base station in a heterogeneous network (HetNet) system in which a high-output base station (macro cell) and a low-output base station (small cell) co-exist while sharing the same frequency.

Solution to Problem

In accordance with the disclosure, a communication method of a first base station in a heterogeneous network wireless communication system, which includes the first base station and a second base station and supports a cell range expansion (CRE) function, includes: monitoring activation or deactivation of the cell range expansion function; if deactivation of the cell range expansion function is detected, generating a handover request message; and transmitting the handover request message to the second base station.

The communication method may further include, if deactivation of the cell range expansion function is detected, maintaining a deactivation state of an almost blank subframe (ABS) function of the first base station for a predetermined time interval.

The predetermined time interval may be a maximum time interval required for handover of the terminal to the first base station by the second base station.

A cell region of the second base station may be changed from a first region to a second region due to the deactivation of the cell range expansion function, and the handover request message may be a message that requests a terminal, which is located outside the second region and inside the first region and is connected to the second base station, to handover to the first base station.

The communication method may further include: receiving a handover completion message from the first base station; and deactivating the almost blank subframe (ABS) function of the first base station.

The first base station may be a macro base station and the second base station may be a pico base station.

In accordance with the disclosure, a handover method of a second base station in a heterogeneous network wireless communication system, which includes a first base station and the second base station and supports a cell range expansion (CRE) function, may include: receiving a handover request message, which has been generated according to deactivation of the cell range expansion function, from the first base station; and performing a handover at least one terminal, which has been determined based on the handover request message, to the first base station.

In the handover method, a cell region of the second base station is changed from a first region to a second region due to the deactivation of the cell range expansion function, and the performing the handover may include: determining a terminal, which is located outside the second region and inside the first region and is connected to the second base station; and performing the handover the determined terminal to the first base station.

The handover method may further include: generating a handover completion message after handover of the terminal is completed; and transmitting the handover completion message to the first base station.

The first base station may be a macro base station and the second base station may be a pico base station.

In accordance with the disclosure, a first base station in a heterogeneous network wireless communication system, which includes the first base station and a second base station and supports a cell range expansion (CRE) function, may include: a first base station controller configured to monitor activation or deactivation of the cell range expansion function, and generate a handover request message if deactivation of the cell range expansion function is detected; and a first base station transceiver configured to transmit the handover request message to the second base station.

The first base station controller may maintain a deactivation state of an almost blank subframe (ABS) function of the first base station for a predetermined time interval if deactivation of the cell range expansion function is detected.

The predetermined time interval may be a maximum time interval required for handover of the terminal to the first base station by the second base station.

A cell region of the second base station may be changed from a first region to a second region due to the deactivation of the cell range expansion function, and the handover request message may be a message that requests a terminal, which is located outside the second region and inside the first region and is connected to the second base station, to perform a handover to the first base station.

The first base station transceiver may receive a handover completion message from the first base station, and the first base station controller may deactivate the almost blank subframe (ABS) function of the first base station if the handover completion message is received by the first base station transceiver.

The first base station may be a macro base station and the second base station may be a pico base station.

In accordance with the disclosure, a second base station in a heterogeneous network wireless communication system, which includes a first base station and the second base station and supports a cell range expansion (CRE) function, may include: a second base station transceiver configured to receive a handover request message, which has been generated according to deactivation of the cell range expansion function, from the first base station; and a second base station controller configured to perform a handover at least one terminal, which has been determined based on the handover request message, to the first base station.

A cell region of the second base station may be changed from a first region to a second region due to the deactivation of the cell range expansion function, and the second base station controller may determine a terminal, which is located outside the second region and inside the first region and is connected to the second base station, and performs a handover the determined terminal to the first base station.

The second base station controller may generate a handover completion message after handover of the terminal is completed, and the second base station transceiver may transmit the handover completion message to the first base station.

The first base station may be a macro base station and the second base station may be a pico base station.

Advantageous Effects of Invention

The disclosure can prevent the occurrence of a radio link failure (RLF) due to deactivation of a cell range expansion function (CRE) in a heterogeneous network mobile communication system in which a macro base station and a small base station co-exist.

MODE FOR CARRYING OUT THE INVENTION

Figure 1:
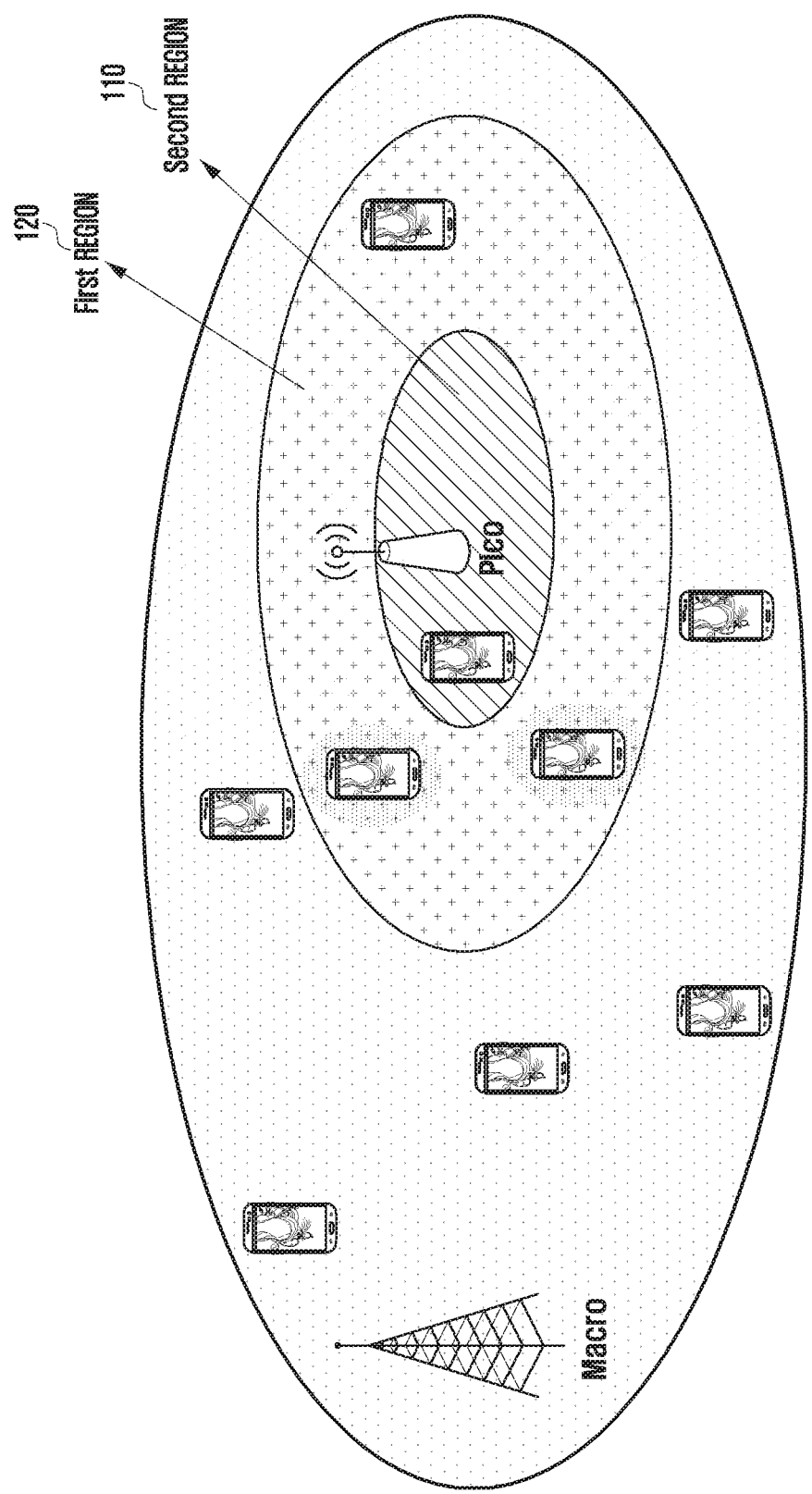
FIG. 1 illustrates expansion of a coverage of a small cell by using an eICIC technology.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may, in fact, be executed substantially concurrently or the blocks may sometimes be executed in the reverse order, depending upon the functionality involved.

As used herein, the "unit", which is used in the embodiments, refers to a software element or a hardware element, such as a field programmable gate array (FPGA) or an application specific integrated circuit (ASIC), and performs a predetermined function. However, the "unit" does not always have a meaning limited to software or hardware. The "unit" may be constructed either to be stored in an addressable storage medium or to execute one or more processors. Therefore, the "unit" includes, for example, elements such as software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Further, in the embodiments, the "unit" may include one or more processors.

Hereinafter, described is a method and apparatus configured to handover a terminal depending on whether a cell range expansion (CRE) function is activated, in a heterogeneous network (HetNet) system in which a high-output base station (macro cell) and a low-output base station (small cell) mixedly exist while sharing the same frequency.

More specifically, the disclosure provides a method and apparatus configured to prevent radio link failure (RLF) which may be incurred by a cell region change of a base station in a heterogeneous network system.

In general, a macro cell has a relatively high output and a wide region coverage. On the other hand, a small cell has a relatively low output and a narrower region coverage than the coverage of the macro cell, but has an advantage of inexpensive cell expansion.

The small cell is mainly used to cover a coverage hole region which is not covered by the macro cell, or used to absorb load of the macro cell. However, there is a problem that the small cell cannot effectively absorb the load of the macro cell due to the narrow coverage.

The 3GPP LTE standard employs an enhanced inter-cell interference coordination (eICIC) or time-domain ICIC technology in order to enable the small cell to effectively absorb the load of the macro cell.

Generally, a cellular wireless communication system is operated such that a cell having the maximum downlink reception power is appointed as a serving cell for a given user to allow the user to download data traffic from the serving cell. On the other hand, the eICIC technology is a standard technology which appoints a small cell as a serving cell for a user, whose macro cell has a larger downlink reception power than the downlink reception power of the small cell, to allow the user to download data traffic from the small cell.

FIG. 1 illustrates expansion of a coverage of a small cell by using an eICIC technology.

As illustrated in FIG. 1, by using the eICIC technology, a second region 110, which is coverage of a conventional small cell, can be expanded to a first region 120. As a result, a small cell can absorb more users of a macro cell and can thus distribute load of the macro cell to the small cell.

Further, users located in the expanded coverage of the small cell as illustrated in FIG. 1, i.e. users located inside the first region 120 and outside the second region 110, may undergo interference by the macro cell, which is stronger than a signal of the small cell, and thus have a greatly degraded wireless channel quality. Accordingly, the users located in the expanded coverage of the small cell may have a difficulty in performing a normal wireless communication.

To solve this technical problem, a 3GPP LTE eICIC technology provides an ABS pattern technology and a resource restriction technology.

According to the ABS pattern technology, a macro cell provides information, i.e. an ABS pattern, to a small cell undergoing main interference from the macro cell. According to an eICIC standard of 3GPP LTE FDD, the ABS pattern information includes a 40-bit bit stream and indicates whether transmission (Tx) power of a macro cell, which repeats at a cycle of 40 ms, is restricted. For example, a first bit value among the 40 bits may indicate whether the transmission (Tx) power of a macro cell is restricted in a first subframe among the cycle of 40 ms. For instance, if the corresponding value is 1 (=ABS), it indicates that the transmission (Tx) power of the macro cell decreases, and if the corresponding value is 0 (=nonABS), it indicates that the macro cell is not restricted by a special transmission (Tx) power.

In general, according to the eICIC technology, a terminal located in the expanded coverage of a small cell undergoes high interference by a macro cell, and it is thus advantageous, in securing the wireless channel quality, to allocate a radio resource to the terminal only in the case of ABS wherein the macro cell reduces the transmission (Tx) power.

That is, the ABS pattern corresponds to a technology for explicitly informing the small cell of whether the transmission (Tx) power of the macro cell decreases, so as to enable the users located in the expanded coverage of the small cell to stably perform a wireless communication.

Meanwhile, the resource restriction technology corresponds to a technology to induce a user to measure a channel only in a specific subframe.

The resource restriction technology may include three patterns.

A first pattern includes 40-bit information and functions to restrict a subframe in which a user measures RSRP and RSRQ for a serving cell and determines radio link failure (RLC).

A second pattern includes 40-bit information and performes a role to restict a subframe in which a user measures RSRP and RSRQ for a neighbor cell.

A third pattern includes two pieces of 40-bit information. A first 40 bit may perform a role to indicate a subframe to be used to measure a first channel quality indicator (CQI). A second 40 bit performs a role to indicate a subframe to be used to measure a second channel quality indicator.

According to a general eICIC technology, a network uses the third pattern to enable a user to discriminately sort and measure a channel quality indicator in the ABS and a channel quality indicator in the nonABS. By using this technology, in case of allocating the radio resource to the user, the network may apply a proper channel quality indicator depending on whether the ABS of the corresponding subframe exists, so as to perform resource allocation and a decision of modulation and coding scheme (MSC).

For reference, while the ABS pattern may be changed according to time, transferring of the third pattern to the user causes signaling overhead. Therefore, it is necessary to efficiently operate the third pattern.

Further, a 3GPP LTE standard also employs a further enhanced inter-cell interference coordination (FeICIC) technology in order to provide a more effective load distribution function.

The FeICIC technology enables a base station to transfer interference cell information to a terminal via signaling so as to remove interference by a cell-specific reference signal (CRS) generated from the interference cell and thus improve a channel quality.

Particularly, if the macro cell performs the ABS, a channel quality of a UE of the small cell can be improved. Therefore, it is expected that the FeICIC can provide an effect of enlarging the coverage of the small cell wider than the existing eICIC.

The disclosure provides a method and apparatus configured to effectively manage a terminal by a base station in a heterogeneous network mobile communication system in which a macro cell and a small cell mixedly exist. The description in the specification is based on a 3GPP LTE FDD wireless communication system standard, but can also be expanded to other communication systems. In addition, the description in the specification is based on coverage expansion of a small cell in a network in which a macro cell and a small cell mixedly exist, but can also be expanded to other types of cell configurations. For the sake of convenience, in the description of the specification, a pico cell is employed as an example of the small cell, without being necessarily limited thereto. Further, the embodiments of the disclosure can also be applied to a node such as remote radio head (RRH), transmission point (TP) or the like on the same principle.

Figure 2:
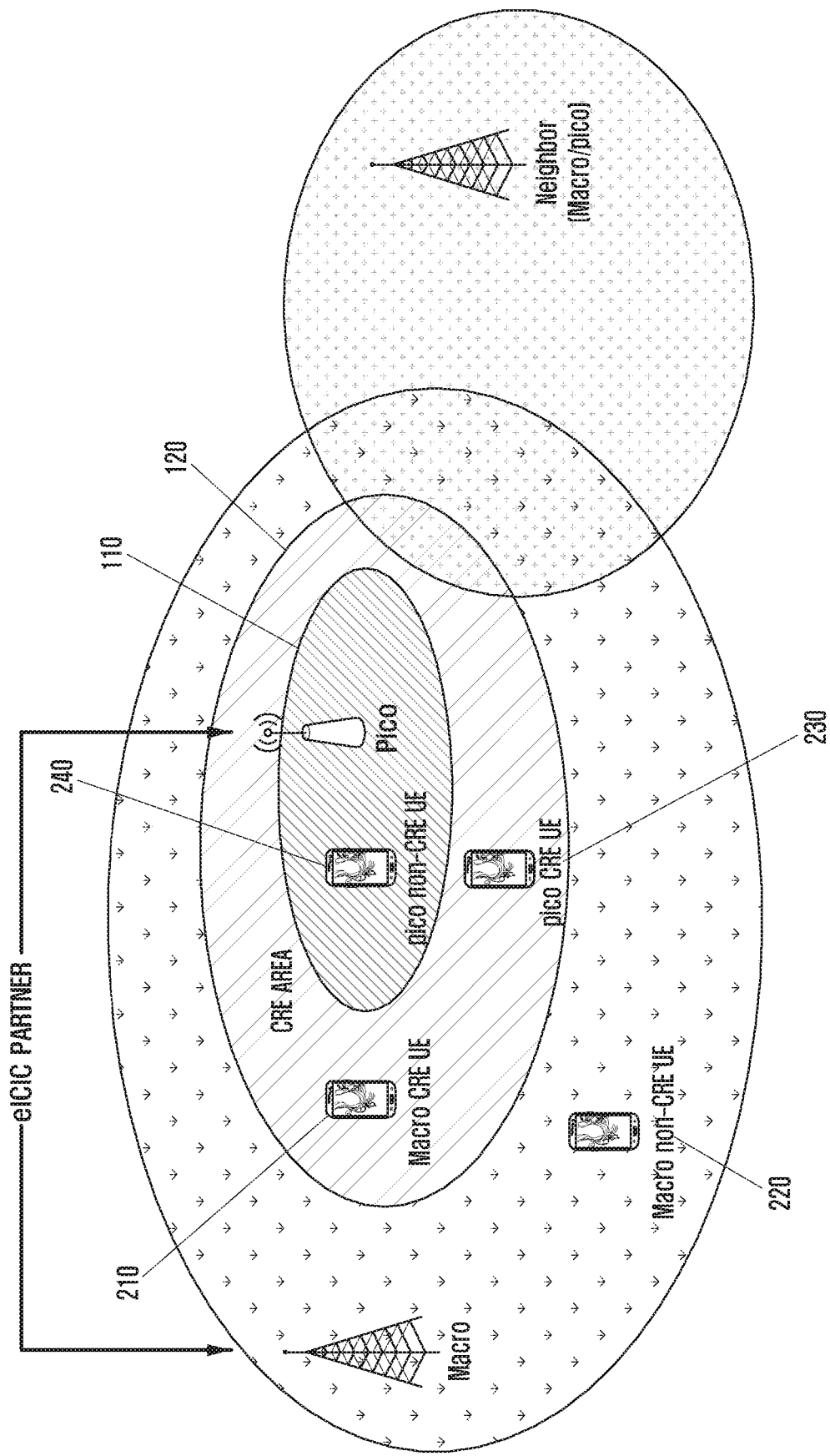
FIG. 2 illustrates a cell region management method according to an embodiment of the disclosure.

FIG. 2 illustrates a cell region management method according to an embodiment of the disclosure.

Hereinafter, a "post-cell range expansion cell region 120" is called a cell-expanded region (CRE region) in contrast to a "pre-cell range expansion cell region 110" of a pico cell.

In this case, according to an embodiment of the disclosure, it should be noted that the "post-cell range expansion cell region 120" may be used to have a meaning that does not include the "pre-cell range expansion cell region 110".

A terminal, which is located in a cell-expandable region of the pico cell and whose serving cell is a macro cell, is called a "macro CRE terminal 210".

Among terminals, whose serving cell is the macro cell, a terminal except the "macro CRE terminal" is called a "macro non-CRE terminal 220".

A terminal, which is located in the cell-expanded region of the pico cell and whose serving cell is the pico cell, is called a "pico CRE terminal 230".

Among terminals, whose serving cell is the pico cell, a terminal except the "pico CRE terminal" is called a "pico non-CRE terminal 240".

In the cell region management method illustrated in FIG. 2, a coverage-expandable region of the pico cell (reserved region or CRE region) is operated as a "shared cell region" of the macro cell and the pico cell, not a unique cell region of the macro cell or the pick cell.

In an embodiment illustrated in FIG. 2, a UE included in the reserved region is distinguished through a unique UE management method. The macro cell can distinguish between a macro CRE UE in the CRE region and a macro non-CRE UE which is not located in the CRE region.

Likewise, the pico cell can also distinguish between a pico CRE UE in the CRE region and a pico non-CRE UE which is not located in the CRE region.

According to an embodiment of the disclosure, illustrated in FIG. 2, if a load difference between the macro cell and the pico cell is larger than a predetermined reference threshold, a CRE region UE having a high-load cell as a serving cell may be forced to handover to a low-load cell.

Further, in order to prevent a handover ping-pong phenomenon, a cellular system applies hysteresis to a handover occurrence condition, so that a shared cell region is generally formed.

For example, the shared cell region formed at a boundary between the macro cell and the pico cell is a region which serves as either a macro cell region or a pico cell region. If a UE moves within the shared cell region, handover does not occur. The shared cell region is a good solution to prevent the handover ping-pong, but has a weakness in that a UE cannot have the optimum cell as a serving cell in the perspective of signal strength. For example, a pico UE may be located at a position where a stronger macro cell signal is received, rather than a macro UE.

An embodiment according to the digraph illustrated in FIG. 2 uses a method of operating the shared cell region (or CRE region), which exists at the boundary between the macro cell and the pico cell, more widely, so there is a fear that the UE cannot have the optimum cell as a serving cell in the perspective of signal strength.

Figure 3:
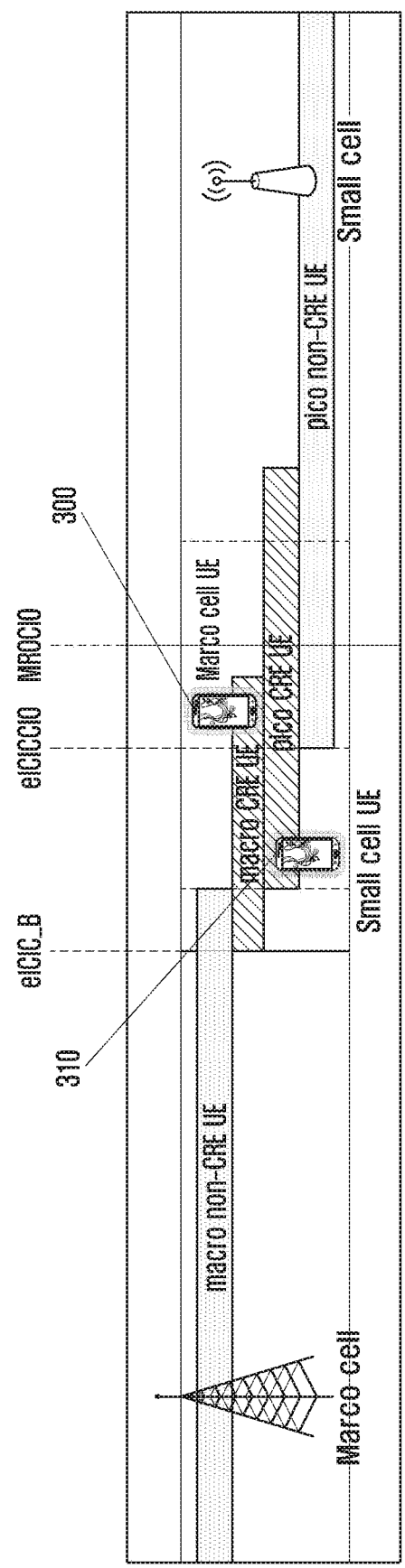
FIG. 3 illustrates regions in which a UE may be located according to groups in a wireless communication system supporting an eICIC function of the disclosure.

FIG. 3 illustrates regions in which a UE may be located according to groups in a wireless communication system supporting an eICIC function of the disclosure.

The groups refers to four groups of a macro non-CRE UE, a macro CRE UE, a pico non-CRE UE, and a pico CRE UE. Since the definition of the groups has been described above with reference to FIG. 2, a detailed description thereof will be omitted below.

An overlapping region between a region where a macro CRE UE is located and a region where a pico CRE UE is located is a CRE region.

Specifically, if a macro UE passes eICIC_B, it is managed as the macro CRE UE, but does not yet handover to the pico cell. However, if the macro UE passes expanded CIO, i.e. eICICCIO, the macro CRE UE may handover to the pico cell.

Unlike FIG. 3, if the eICICCIO has been expanded to the eICIC_B, the macro UE may handover to the pico cell immediately after passing the eICIC_B. That is, the macro UE is managed as a macro cell UE in an expandable region of the pico cell, but may be managed as a pico cell UE after entering an expanded region of the pico cell.

On the other hand, if the pico UE passes a pre-expansion cell boundary (MROCIO), the pico UE is managed as the pico CRE UE before passing the eICICCIO, and may handover to the macro cell after passing the eICICCIO. If the eICICCIO has been expanded to the eICIC_B, the pico UE may be continuously managed as the pico CRE UE before passing the eICIC_B.

Referring to FIG. 3, for example, like the case of the illustrated UE, the macro UE 300 may be located at a position where a pico cell signal received by the macro UE is stronger than that received by the pico UE 310. In this case, serving cells of the two UEs may be exchanged in order to avoid unnecessary radio resource waste due to degraded wireless channel quality.

Further, according to an embodiment of the disclosure, an A3 event of the 3GPP LTE standard is applied in order to distinguish a CRE region UE. If an A3 event entry condition is satisfied, an MR is operated to be transmitted only once in order to reduce an unnecessary RSRP information report of a UE (which is called an MR in 3GPP LTE, measurement report).

However, since the same A3 event is used to determine HO for other cells, only one-time transmission of the MR may cause the degradation of HO quality.

Figure 4A:
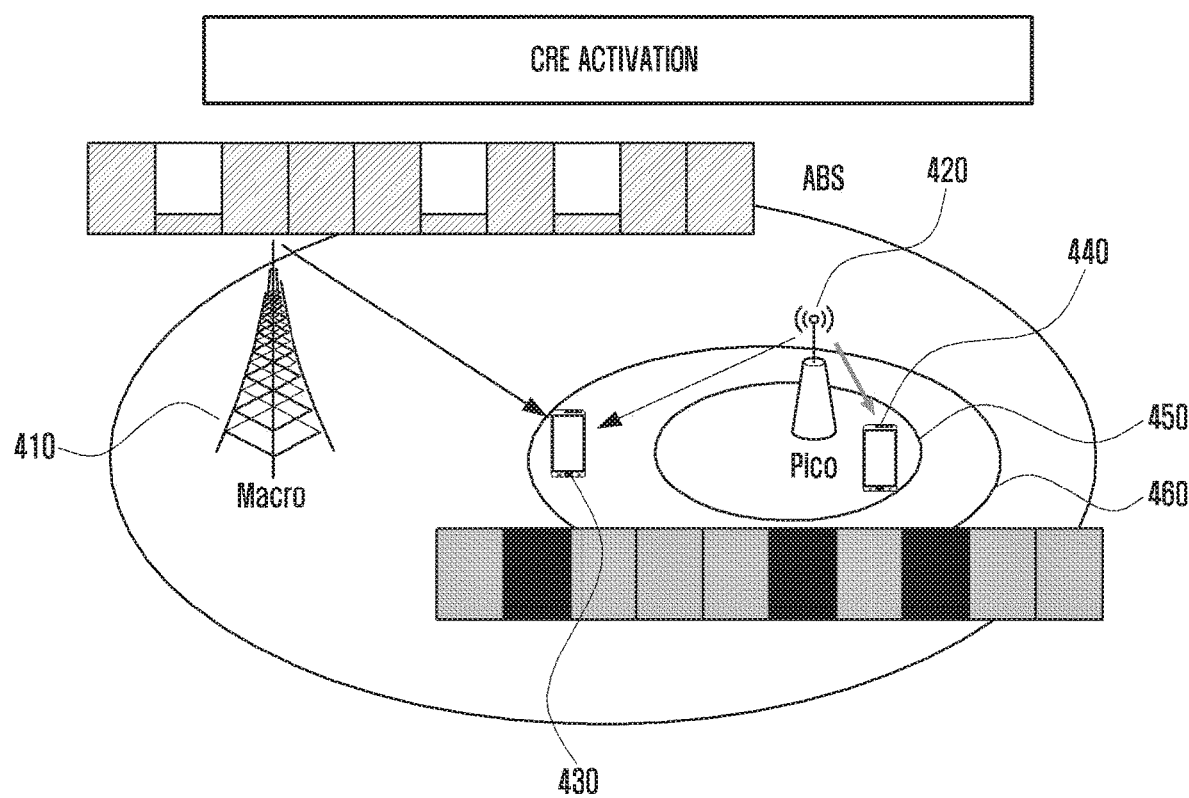
FIG. 4A illustrates communication between a base station and a terminal in case a cell range expansion function is activated.

FIG. 4A illustrates communication between a base station and a terminal in case a cell range expansion function is activated.

As discussed above, if a cell range expansion function, i.e. a CRE function, is activated, cell coverage of a pico base station 420 is expanded from a second region 450 to a first region 460. In addition, an ABS function is activated and a macro base station 410 may thus form an ABS pattern as shown in FIG. 4A.

Then, a terminal 440 located inside the second region 450 performs communication with the pico base station 420 regardless whether the cell range expansion function has been activated or deactivated.

On the other hand, a terminal 430 located outside the second region 450 and inside the first region 460 performs communication with the macro base station 410 before the cell range expansion function is activated, and performs communication with the pico base station 420 after the cell range expansion function is activated.

More specifically, if the macro terminal 430, which is connected to the macro base station 410 and is located in the cell-expandable region of the pico base station 420, enters the cell-expanded region of the pico base station 420 by the formation of the ABS pattern of the macro base station 410, the macro terminal 430 may handover from the macro base station 410 to the pico base station 420.

That is, if the cell range expansion function is activated, the ABC pattern function of the macro base station 410 is activated as illustrated in FIG. 4A, and the pico base station 420 may perform communication with the terminal 430 without interference from the macro base station 410, by using the ABS pattern.

Figure 4B:
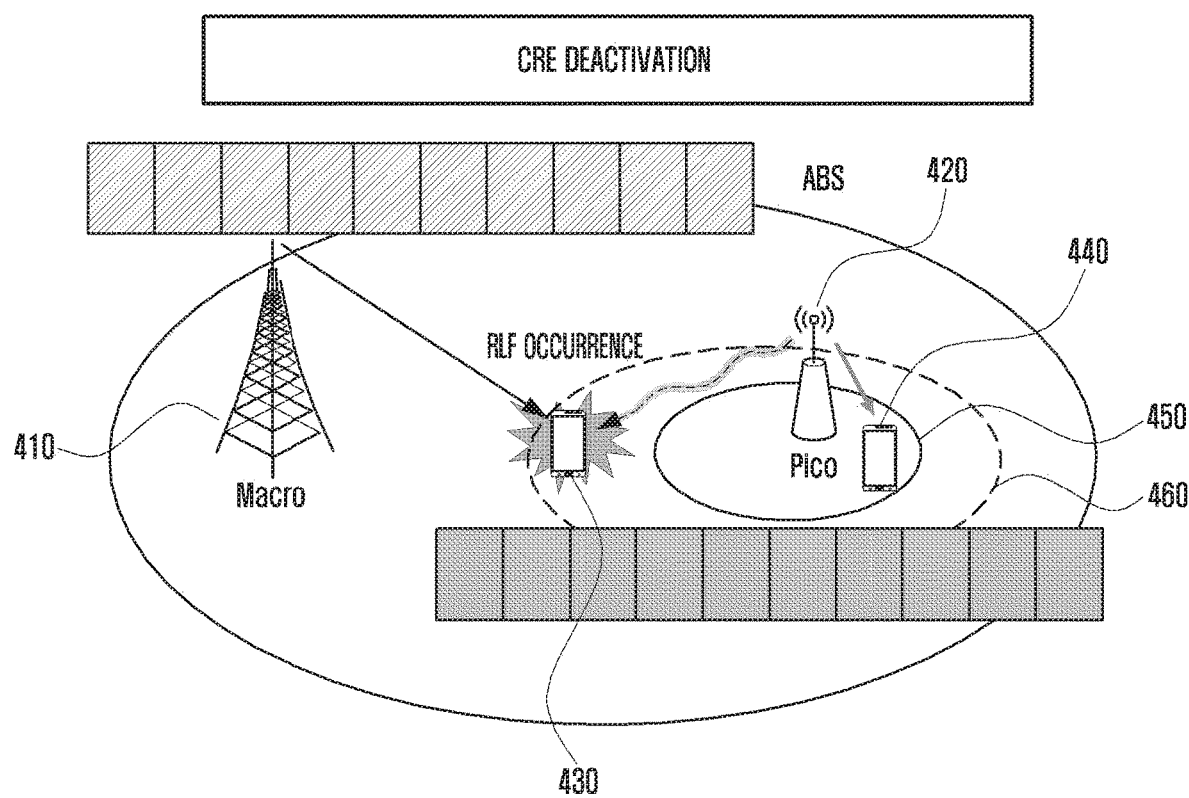
FIG. 4B illustrates communication between a base station and a terminal in case a cell range expansion function is deactivated.

FIG. 4B illustrates communication between a base station and a terminal in case a cell range expansion function is deactivated.

If the cell range expansion function is changed from the activation state to the deactivation state, the cell coverage of the pico base station 420 is changed from the first region 460 to the second region 450.

In this case, even after the cell range expansion function is changed to be in the deactivation state, the terminal 440 located inside the second region 450 is still located in the cell coverage of the pico base station 420 and can thus maintain communication with the pico base station 420.

On the other hand, as the cell range expansion function is changed to be in the deactivation state, the terminal 430 located outside the second region 450 and inside the first region 460 may undergo radio link failure (RLF) as shown in FIG. 4B.

That is, if the cell range expansion function is deactivated, the RLF may occur in a pico CRE UE located in a cell-expanded region, among terminals which can be supported by ABS. (It should be noted that even though the cell range expansion function is deactivated, the RLF does not occur in a macro CRE UE, which can be supported by the ABS and is located in a cell-expanded region).

More specifically, as an ABS function of a macro base station 410 is deactivated due to the deactivation of the cell range expansion function, the interference of the macro base station 410 influences communication between the pico base station 420 and the terminal 430, and thus RLF may occur in the terminal 430.

Thus, in order to prevent the occurrence of the RLF, even though the cell range expansion function is deactivated, it is required to maintain the activation of the ABS function before the terminal 430 handovers to the macro base station 410, so as to minimize the interference by the macro base station 410.

Therefore, the disclosure provides a method for preventing occurrence of RLF due to the deactivation of the cell range expansion function, by maintaining an activation state of the ABS function of the macro base station for a predetermined time interval, even though the cell range expansion function is deactivated, and a detailed description thereof will be given below with reference to FIG. 5.

Figure 5:
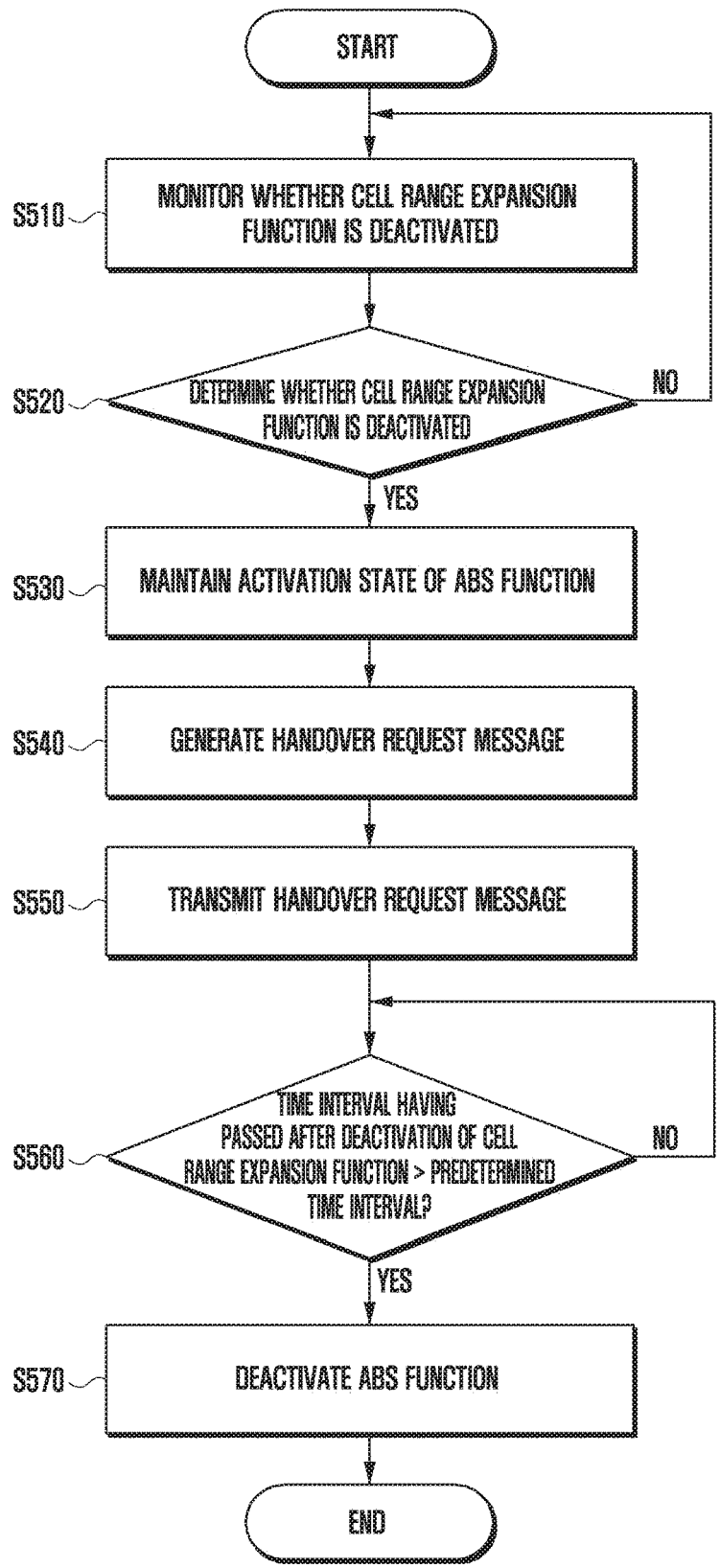
FIG. 5 is a flowchart illustrating a communication method for a first base station according to an embodiment of the disclosure.

FIG. 5 is a flowchart illustrating a communication method for a first base station according to an embodiment of the disclosure.

In operation S510, a first base station monitors whether a cell range expansion function is deactivated. As described above, since there is a high possibility that a phenomenon, in which RLF occurs in a terminal, may occur at the moment when the cell range expansion function is converted from an activation state to a deactivation state, the first base station may monitor whether the cell range expansion function is deactivated, in real time.

The first base station may indicate a macro base station, and the first base station can reduce the load of the first base station by monitoring whether the cell range expansion function is deactivated, at predetermined periodic intervals, instead of monitoring in real time whether the cell range expansion function is deactivated.

Through operation S520, if the cell range expansion function is determined as still maintaining the activation state, the first base station returns to operation S510 and then consistently monitors the state of the cell range expansion function.

On the other hand, if the deactivation of the cell range expansion function is detected, the first base station maintains the activation state of an ABS function through operation S530. The cell range expansion function can be deactivated by various reasons. For example, if the load of the first base station increases, it is inefficient to maintain the activation state of the ABS function, and in this case, the first base station may thus deactivate the cell range expansion function.

As described above, if the cell range expansion function is deactivated, the ABS function of the first base station is also deactivated and RLF may thus occur in a terminal located in a specific region. Therefore, in order to prevent the occurrence of RLF, in operation S530, the first base station maintains the activation state of the ABS function even though the cell range expansion function is deactivated.

In operation S540, the first base station generates a handover request message. The handover request message refers to a message for handover, into the first base station, of a terminal in which RLF may occur due to the deactivation of the cell range expansion function.

Specifically, if the cell range expansion function is deactivated, a cell region of a second base station corresponding to a pico base station may be changed from a first region to a second region. In this case, a terminal, which is located outside the second region and inside the first region and is connected to the second base station, may undergo RLF due to an interference from the first base station before the terminal handovers to the first base station.

Therefore, in operation S540, the first base station generates a message for handover of the terminal, which is located in the region (outside the second region and inside the first region) and is connected to the second base station. The terminal herein may be a pico CRE UE, and as previously disclosed, refers to a UE which is located in a cell-expanded region of a pico cell and whose serving cell is the pico cell.

In operation S550, the first base station transmits the handover request message generated through operation S540 to the second base station. As previously disclosed, the second base station is a base station whose cell region is changed by the deactivation of the cell range expansion function, and may be, for example, a pico base station.

The handover request message may be transmitted from the first base station to the second base station through a separate operation only for transmission of the handover request message, or if there is another message, which is transmitted from the first base station to the second base station according to the deactivation of the cell range expansion function, the handover request message may be transmitted while being included in said another message.

In operation S560, the first base station determines whether a time interval having passed after the deactivation of the cell range expansion function exceeds a predetermined time interval.

The predetermined time interval may be a maximum time interval required for a terminal having a possibility of the occurrence of RLF to handover from the second base station to the first base station, and the maximum time interval may be determined by the number of terminals which require the handover.

As a result of the determination in operation S560, if the required time interval does not exceed the predetermined time interval after the deactivation of the cell range expansion function, it is considered that a terminal, which should handover from the second base station to the first station, still remains, so the first base station maintains the activation state of the ABS function.

On the other hand, if the required time interval exceeds the predetermined time interval after the deactivation of the cell range expansion function, it is considered that the handover from the second base station to the first base station has been completed. Then, the first base station deactivates the ABS function in operation S570.

Therefore, according to the disclosure, even though the deactivation of the cell range expansion function is detected, the first base station may maintain the activation state of the ABS function for a predetermined time interval, so as to prevent RLF from occurring in a terminal. After the predetermined time interval, the ABS function of the first base station may deactivated to improve communication efficiency of the first base station.

Figure 6:
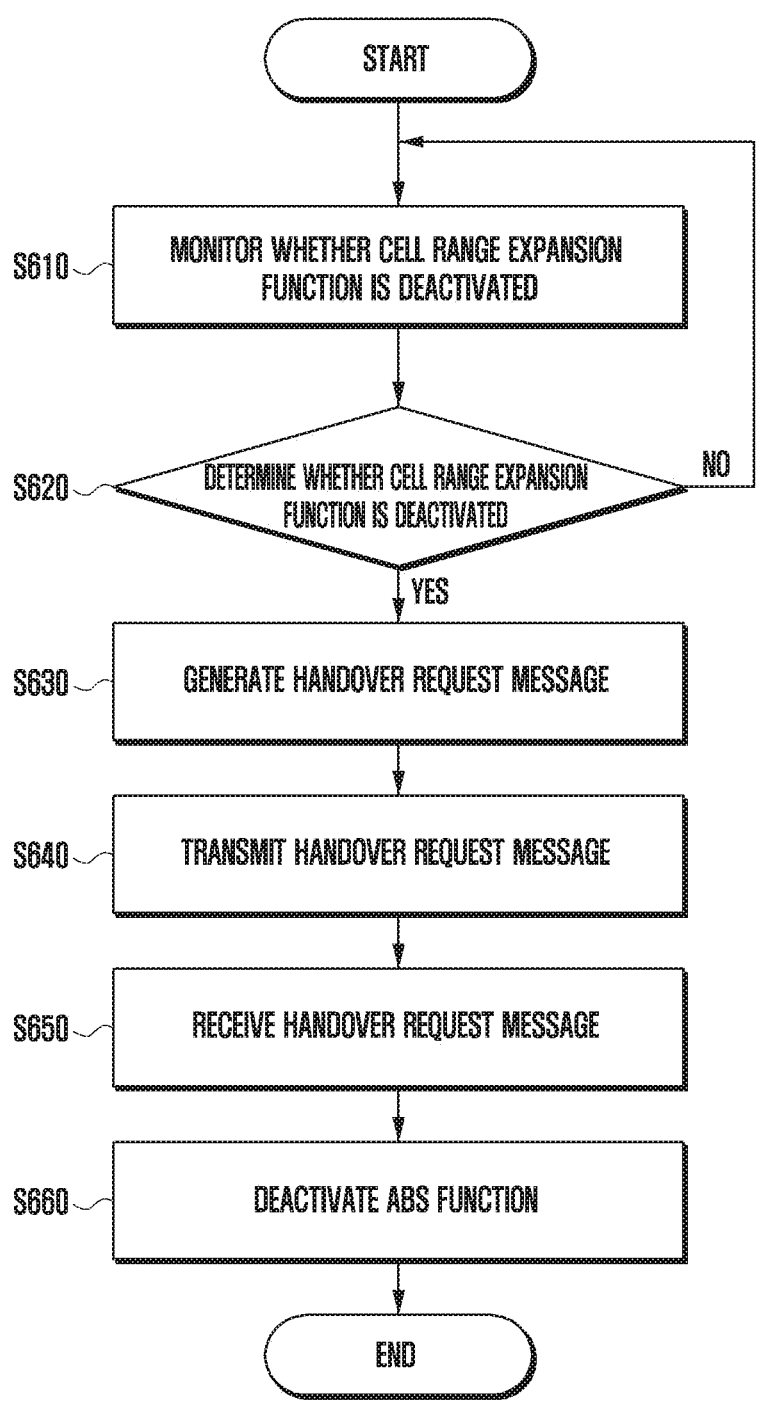
FIG. 6 is a flowchart illustrating a communication method for a first base station according to an embodiment of the disclosure.

FIG. 6 is a flowchart illustrating a communication method for a first base station according to an embodiment of the disclosure.

A communication method for a first base station illustrated in FIG. 6 is generally similar to the communication method for a first base station illustrated in FIG. 5. In FIG. 6, if the deactivation of a cell range expansion function is detected, the first base station does not maintain an activation state of an ABS function for a predetermined time interval, but maintains a deactivation state of the ABS function until receiving a handover completion message from a second base station.

Specifically, the first base station transmits a handover request message to the second base station through operation S640. Thereafter, if the first base station receives the handover completion message from the second base station through operation S650, the first base station deactivates the ABS function through operation S660. (A description of operations S610-S640 has been already given above with reference to FIG. 5 and is thus omitted here.

That is, in case of following the communication method for a first base station illustrated in FIG. 6, the first base station maintains the activation state of the ABS function before receiving the handover completion message from the second base station, and thus can prevent the occurrence of RLF of a terminal due to the deactivation of the cell range expansion function.

The first base station may receive the handover completion message from the second base station through a separate operation only for reception of the handover completion message, or if there is another message, which the first base station receives from the second base station according to the deactivation of the cell range expansion function, the handover completion message may be included in said received another message.

Figure 7:
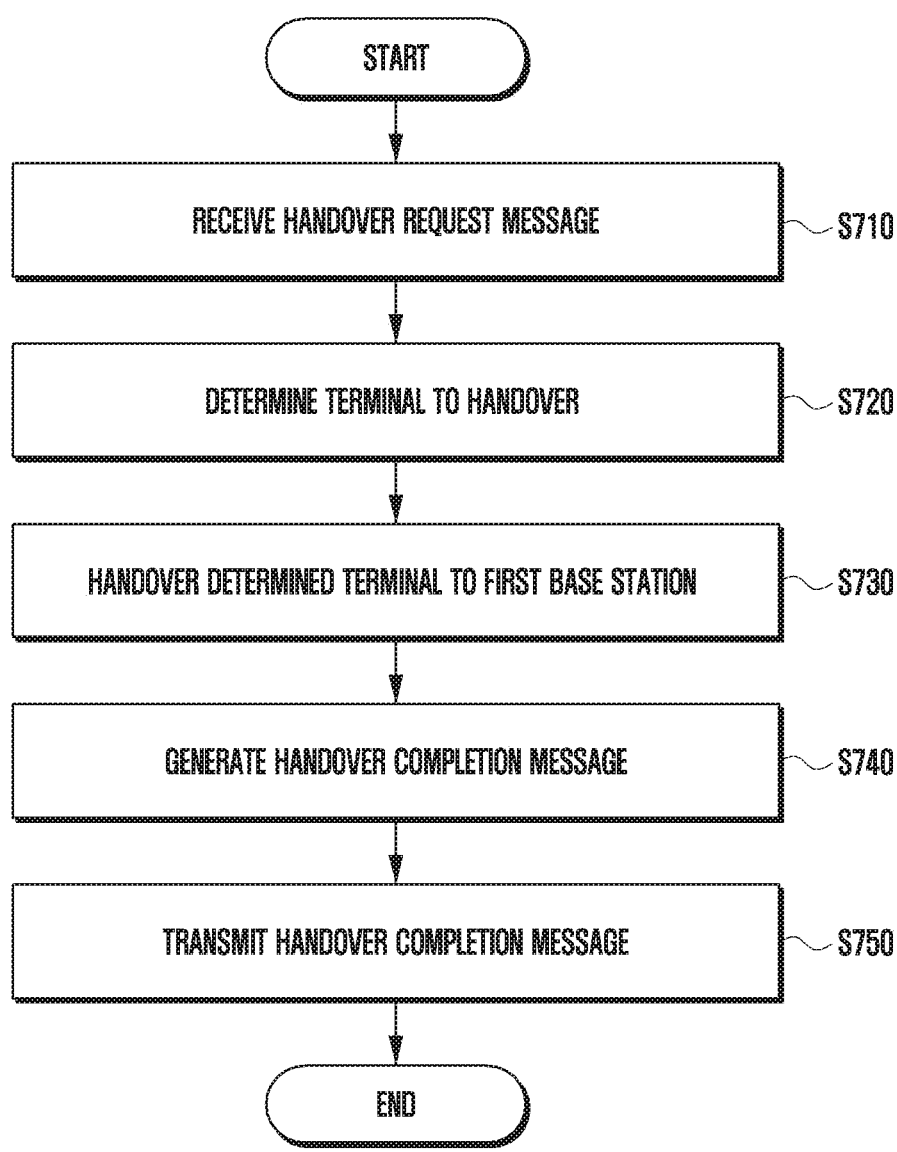
FIG. 7 is a flowchart illustrating a handover method for a second base station according to an embodiment of the disclosure.

FIG. 7 is a flowchart illustrating a handover method for a second base station according to an embodiment of the disclosure.

In operation S710, a second base station may receive a handover request message generated by the deactivation of a cell range expansion function from a first base station.

In operation S720, the second base station determines a terminal to be handovered to the first base station. More specifically, if a cell region of the second base station is changed from the first region to the second region by the deactivation of the cell range expansion function, a terminal, which is located inside the first region and outside the second region and is connected to the second base station, is determined as a terminal to be handovered to the first base station.

In operation S730, the second base station handovers the terminal, which has been determined through operation S720, to the first base station. As previously disclosed, the terminal may be a pico CRE UE (UE which is located in a cell-expanded region of a pico cell and whose serving cell is a pico cell).

Then, if the second base station determines that the handover of all terminals, which are located inside the first region and outside the second region, has been completed, the second base station generates a handover completion message through operation S740.

The handover completion message may include information on a time interval required for completion of the handover after the handover request message is received, and information of the handovered terminal, as well as information reporting that the handover of the terminal requiring the handover has been completed.

In operation S740, the second base station transmits the generated handover completion message to the first base station.

The first base station deactivates the ABS function through the transmission of the handover completion message, and the second base station, whose cell region has been changed to the second region, accordingly performs communication with the terminal located in the second region.

Figure 8:
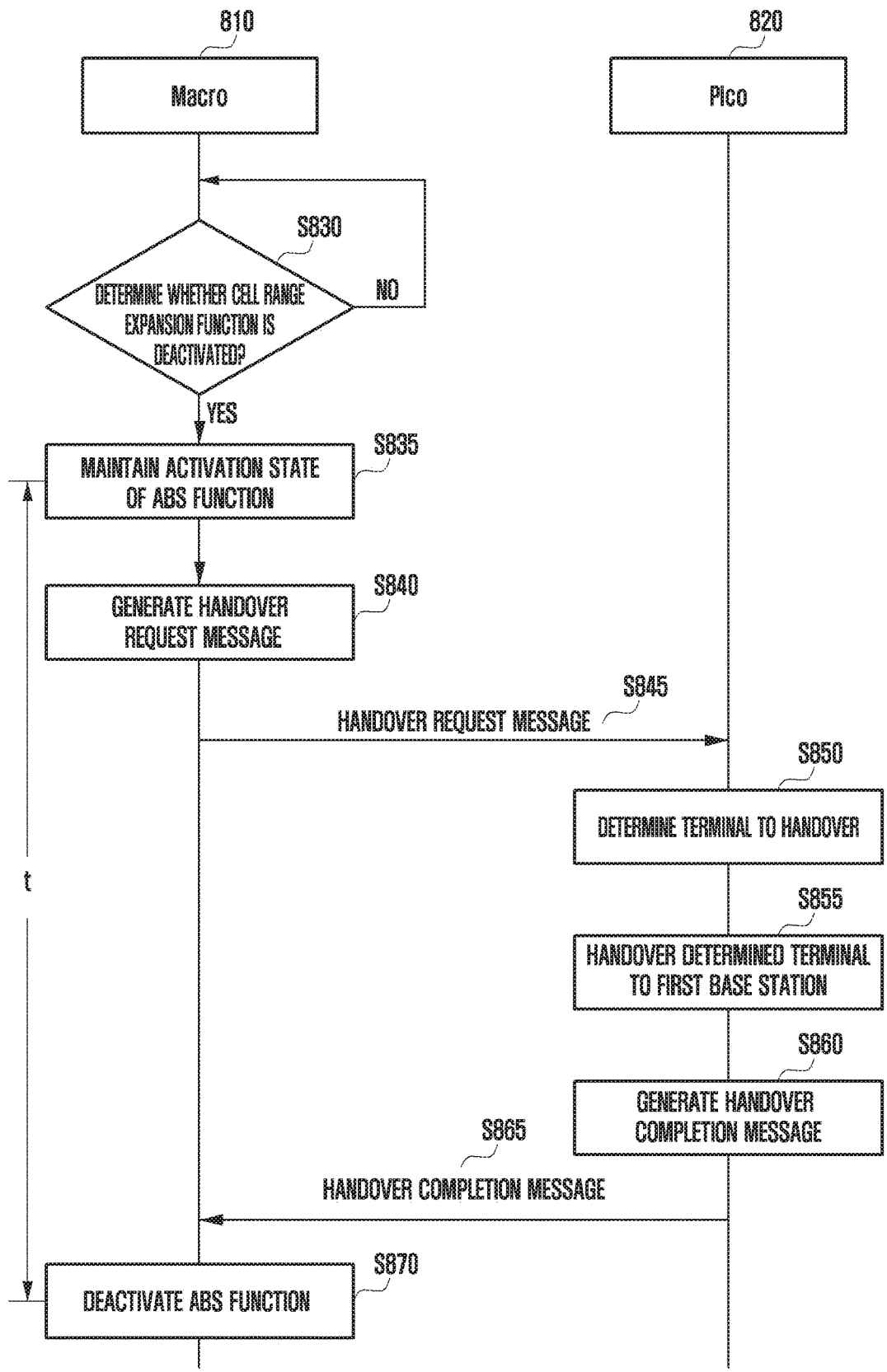
FIG. 8 is a single flow diagram illustrating a handover method in a wireless communication system supporting an eICIC function according to an embodiment of the disclosure.

FIG. 8 is a signal flow diagram illustrating a handover method in a wireless communication system supporting an eICIC function according to an embodiment of the disclosure, wherein a first base station is a macro base station 810 and a second base station is a pico base station 820.

If deactivation of a cell range expansion function is detected through operation S830, the macro base station 810 does not deactivate an ABS function immediately, and maintains an activation state of the ABS function through operation S835.

Thereafter, the macro base station 810 generates a handover request message through operation S840, and the macro base station 810 transmits the handover request message to the pico base station 820 through operation S845.

The pico base station 820, which has received the handover request message, determines a terminal to handover to the macro base station 810 through operation S850. Specifically, if a cell region of the pico base station 820 is changed from a first region to a second region due to the deactivation of a cell range expansion function, the pico base station 820 determines a terminal, which is located inside the first region and outside the second region and is connected to the second base station, as the terminal to be handovered.

Thereafter, the pico base station 820 handovers the terminal, which has been determined through operation S850, to the macro base station 810 through operation S855. If the handover is completed, the pico base station generates a handover completion message through operation S860.

As previously disclosed, the terminal may be a pico CRE UE (UE which is located in a cell-expanded region of a pico cell and whose serving cell is the pico cell).

Then, through operation S865, the pico base station 820 transmits the handover completion message to the macro base station 810, and the macro base station 810, which has received the handover completion message, deactivates the ABS function through operation S870.

Accordingly, by the deactivation of the cell range expansion function, RLF may not occur in a terminal located in an expanded region of the pico base station 820. As a result, the macro base station 810 can improve the efficiency of communication with a terminal by deactivating the ABS function.

If a time interval from operation S835, i.e. after the deactivation of the cell range expansion function, to operation S870 in which the ABS function is deactivated, is put as "t", "t" may indicate the maximum time interval required for a terminal to handover from the second base station to the first base station as described above.

Figure 9:
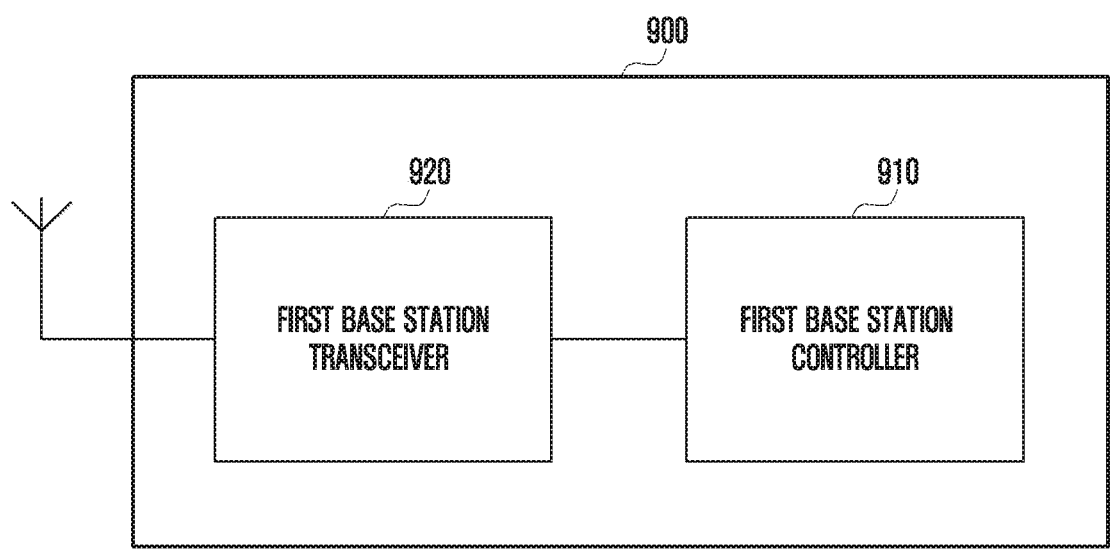
FIG. 9 is a block diagram illustrating an inner structure of a first base station according to an embodiment of the disclosure.

FIG. 9 is a block diagram illustrating an inner structure of a first base station according to an embodiment of the disclosure.

In a heterogeneous network wireless communication system which includes a first base station 900 and a second base station and supports a cell range expansion (CRE) function, the first base station 900 monitors whether the cell range expansion function is deactivated. The first base station may include a first base station controller 910 configured to generate a handover request message if deactivation of the cell range expansion function is detected, and a first base station transceiver 920 configured to transmit the handover request message to the second base station.

If the deactivation of the cell range expansion function is detected, the first base station controller 910 may maintain an activation state of an almost blank subframe (ABS) function of the first base station for a predetermined time interval.

In addition, a cell region of the second base station is changed from a first region to a second region by the deactivation of the cell range expansion function, and the handover request message may be a message to request a terminal, which is located outside the second region and inside the first region and is connected to the second base station, to handover to the first base station.

As described above, the terminal may be a pico CRE UE (UE which is located in a cell-expanded region of a pico cell and whose serving cell is the pico cell).

The first base station transceiver 920 may receive a handover completion message from the second base station. If the handover completion message is received through the first base station transceiver 910, the first base station controller 910 may deactivate the almost blank subframe (ABS) function of the first base station 900.

Figure 10:
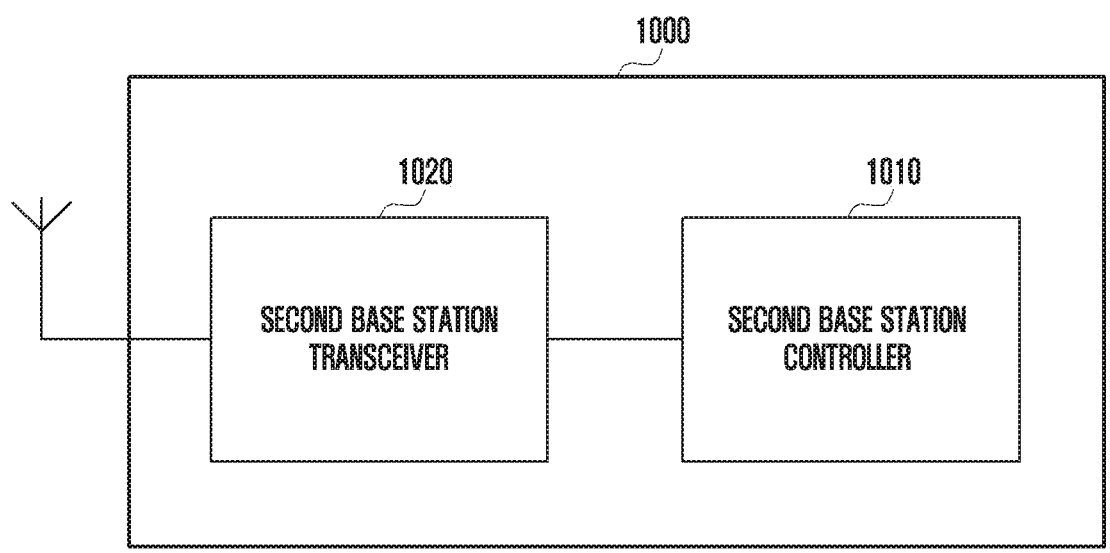
FIG. 10 is a block diagram illustrating an inner structure of a second base station according to an embodiment of the disclosure.

FIG. 10 is a block diagram illustrating an inner structure of a second base station according to an embodiment of the disclosure.

In a heterogeneous network wireless communication system which includes a first base station and a second base station 1000 and supports a cell range expansion (CRE) function, the second base station 1000 may include a second base station transceiver 1020 configured to receive, from the first base station, a handover request message generated by the deactivation of the cell range expansion function, and a second base station controller 1010 configured to handover at least one terminal, which has been determined based on the handover request message, to the first base station.

A cell region of the second base station 1000 is changed from a first region to a second region by the deactivation of the cell range expansion function, and the second base station controller 1010 may determine a terminal which is located inside the first region and outside the second region and connected to the second base station, and may handover the determined terminal to the first base station.

As described above, the terminal may be a pico CRE UE (UE which is located in a cell-expanded region of a pico cell and whose serving cell is the pico cell).

The second base station controller 1010 may generate a handover completion message after the handover of the terminal is completed, and the second base station transceiver 1020 may transmit the handover completion message to the first base station.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiment 1, embodiment 2, and embodiment 3 of the disclosure are combined so as to employ a base station and a terminal. In addition, the above embodiments are presented based on an LTE system, but other modifications based on the technical spirit of the embodiment can be implemented in other systems such as a 5G or NR system or the like.

The invention claimed is:

1. A communication method performed by a first base station in a heterogeneous network wireless communication system including the first base station and a second base station supporting a cell range expansion (CRE) function, the method comprising:

monitoring, by the first base station, whether the CRE function is deactivated;
in case that deactivation of the CRE function is detected, generating, by the first base station, a first message to handover a terminal from the second base station to the first base station; and
transmitting, to the second base station, the first message,
wherein the first base station is a macro base station and the second base station is a pico base station,
wherein a cell region covered by the second base station is changed from a first region to a second region due to the deactivation of the CRE function,
wherein the first region is an extended region compared to the second region based on a cell range expansion, and
wherein the first message is a message that requests a terminal, which is located at the first region except for the second region and is connected to the second base station, to handover to the first base station.

2. The communication method of claim 1, further comprising:
in case that deactivation of the CRE function is detected, maintaining an activation state of an almost blank subframe (ABS) function of the first base station for a predetermined time interval,
wherein the predetermined time interval is a maximum time interval required for handover of the terminal to the first base station by the second base station.

3. The communication method of claim 2, further comprising:
receiving a second message from the first base station; and
deactivating the ABS function of the first base station.

4. A handover method performed by a second base station in a heterogeneous network wireless communication system including a first base station and the second base station supporting a cell range expansion (CRE) function, the method comprising:
receiving, from the first base station, a first message generated by the first base station according to deactivation of the CRE function to handover a terminal from the second base station to the first base station; and
performing a handover of the terminal determined based on the first message to the first base station,
wherein the first base station is a macro base station and the second base station is a pico base station,
wherein a cell region covered by the second base station is changed from a first region to a second region due to the deactivation of the CRE function,
wherein the first region is an extended region compared to the second region based on a cell range expansion, and
wherein performing the handover comprises:
determining a terminal, which is located at the first region except for the second region and is connected to the second base station, and
performing the handover of the determined terminal to the first base station.

5. The handover method of claim 4, further comprising:
generating a second message after handover of the terminal is completed; and
transmitting the second message to the first base station.

6. A first base station in a heterogeneous network wireless communication system including the first base station and a second base station supporting a cell range expansion (CRE) function, the first base station comprising:
a first base station controller configured to:
monitor whether the CRE function is deactivated, and generate a first message to handover a terminal from the second base station to the first base station in case that deactivation of the CRE function is detected; and
a first base station transceiver configured to transmit the first message to the second base station,
wherein the first base station is a macro base station and the second base station is a pico base station,
wherein a cell region covered by the second base station is changed from a first region to a second region due to the deactivation of the CRE function,
wherein the first region is an extended region compared to the second region based on a cell range expansion, and
wherein the first message is a message that requests a terminal, which is located at the first region except for the second region and is connected to the second base station, to handover to the first base station.

7. The first base station of claim 6,
wherein the first base station controller maintains an activation state of an almost blank subframe (ABS) function of the first base station for a predetermined time interval in case that deactivation of the CRE function is detected, and
wherein the predetermined time interval is a maximum time interval required for handover of the terminal to the first base station by the second base station.

8. The first base station of claim 7,
wherein the first base station transceiver receives a second message from the first base station; and
wherein the first base station controller deactivates the ABS function of the first base station in case that the second message is received by the first base station transceiver.

9. A second base station in a heterogeneous network wireless communication system including a first base station and the second base station supporting a cell range expansion (CRE) function, the second base station comprising:
a second base station transceiver configured to receive, from the first base station, a first message generated by the first base station according to deactivation of the CRE function to handover a terminal from the second base station to the first base station; and
a second base station controller configured to perform a handover of the terminal determined based on the first message to the first base station,
wherein the first base station is a macro base station and the second base station is a pico base station,
wherein a cell region covered by the second base station is changed from a first region to a second region due to the deactivation of the CRE function,
wherein the first region is an extended region compared to the second region based on a cell range expansion, and
wherein the second base station controller determines a terminal, which is located at the first region except for the second region and is connected to the second base station, and performs the handover the determined terminal to the first base station.

10. The second base station of claim 9,
wherein the second base station controller generates a second message after handover of the terminal is completed, and
wherein the second base station transceiver transmits the second message to the first base station.

* * * * *